(12) United States Patent
Anno et al.

(10) Patent No.: US 12,554,479 B2
(45) Date of Patent: *Feb. 17, 2026

(54) SYSTEM AND METHOD FOR AUTOMATIC FLEET PARTITIONING

(71) Applicant: ZEBRA TECHNOLOGIES CORPORATION, Lincolnshire, IL (US)

(72) Inventors: Bret M. Anno, Mundelein, IL (US); Leo T. Lowy, Lake Villa, IL (US); Ryan E. Brock, Cary, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 102 days.

This patent is subject to a terminal disclaimer.

(21) Appl. No.: 18/382,012

(22) Filed: Oct. 19, 2023

(65) Prior Publication Data

US 2024/0045920 A1 Feb. 8, 2024

Related U.S. Application Data

(63) Continuation of application No. 16/567,994, filed on Sep. 11, 2019, now Pat. No. 11,797,640.

(51) Int. Cl.
*G06F 16/958* (2019.01)
*G06F 8/61* (2018.01)
(Continued)

(52) U.S. Cl.
CPC ............... *G06F 8/65* (2013.01); *G06F 8/61* (2013.01); *G06F 16/90328* (2019.01);
(Continued)

(58) Field of Classification Search
CPC .... G06F 16/972; G06F 8/61; G06F 16/90328; G06F 16/9035; G06F 16/986;
(Continued)

(56) References Cited

U.S. PATENT DOCUMENTS 8,874,711 B1 10/2014 Zhang et al.
9,110,756 B1 8/2015 Guo et al.
(Continued)

OTHER PUBLICATIONS

Examination Report for Great Britain Application No. 2012533.2 mailed on Mar. 29, 2022.
(Continued)

*Primary Examiner* — Ajay M Bhatia
*Assistant Examiner* — Chongsuh Park (57) ABSTRACT

A system for automatic fleet partitioning includes client devices and a device management server having tag definition and tag assignment repositories. The server receives and stores, in the tag definition repository, definitions with tag assignment criteria; and for each client device: obtains a client identifier and attribute set; for each tag assignment criterion satisfied by the attribute set, associates a corresponding tag name with the client identifier in the tag assignment repository; and for each tag assignment criterion not satisfied by the attribute set, disassociates the corresponding tag name with the client device identifier. The server receives a command to transmit control data to a subset of the client devices associated with a selected tag name; retrieves, from the tag assignment repository, the client identifiers associated with the selected tag name; and transmits the control data to the subset of the client devices.

16 Claims, 5 Drawing Sheets

(51) Int. Cl.
*G06F 8/65* (2018.01)
*G06F 16/9032* (2019.01)
*G06F 16/9035* (2019.01)
*G06F 40/211* (2020.01)
*H04L 67/306* (2022.01)

(52) U.S. Cl.
CPC ........ *G06F 16/9035* (2019.01); *G06F 16/972* (2019.01); *G06F 16/986* (2019.01); *G06F 40/211* (2020.01); *H04L 67/306* (2013.01)

(58) Field of Classification Search
CPC .......... G06F 40/211; G06F 8/65; H04L 67/01; H04L 67/306
See application file for complete search history.

(56) References Cited

U.S. PATENT DOCUMENTS

| | | | |
|---|---|---|---|
| 9,112,777 | B1 | 8/2015 | Barclay et al. |
| 10,163,071 | B1 | 12/2018 | Quan et al. |
| 11,184,906 | B1 * | 11/2021 | Park ...................... H04L 5/0025 |
| 11,797,640 | B2 | 10/2023 | Anno et al. |
| 2006/0277253 | A1 | 12/2006 | Ford |
| 2007/0251835 | A1 * | 11/2007 | Mehta ..................... G16H 20/17 |
| | | | 205/783 |
| 2008/0082657 | A1 | 4/2008 | Hart et al. |
| 2008/0133486 | A1 | 6/2008 | Fitzgerald et al. |
| 2013/0125107 | A1 * | 5/2013 | Bandakka ............... H04L 67/10 |
| | | | 717/171 |
| 2013/0262645 | A1 | 10/2013 | Akchurin et al. |
| 2015/0074114 | A1 | 3/2015 | Saito |
| 2016/0057020 | A1 | 2/2016 | Halmstad et al. |
| 2017/0064567 | A1 * | 3/2017 | Ponnuswamy ....... H04W 24/02 |
| 2017/0230248 | A1 | 8/2017 | Broch et al. |
| 2017/0337226 | A1 | 11/2017 | Bliss et al. |
| 2018/0173517 | A1 * | 6/2018 | Shantharam ............ H04W 4/08 |
| 2019/0179912 | A1 * | 6/2019 | Schouten ................ G06F 16/14 |
| 2019/0213462 | A1 | 7/2019 | McDonald et al. |
| 2020/0037224 | A1 * | 1/2020 | Dinakaran ............ G06F 9/5072 |

OTHER PUBLICATIONS

Anonymous: "Junos Space Network Managemnet Platform-Workspaces Feature Guide—Chapter 75 Managing Tags", Mar. 26, 2018 (Mar. 26, 2018), pp. 1-33, XP055828962, Internet extract: URL: https://www.juniper.net/documentation/en_US/junos-space16.1/platform/information-products/pathway-pages/workspaces.pdf [extract on Jul. 29, 2021].

Anonymous:"Tags." Jan. 5, 2017 (Jan. 5, 2017), pp. 1-4, XP055828966, Internet extract: URL: https://www.cisco.com/c/en/us/td/docs/unified_computing/ucs/ucs-central/cli-references-manual/1-5/b_CiscoUCSCentral-CLI-Reference-Manual-Release1-5/b_CiscoUCSCentral-CLI-Reference-Manual-Release 1-5_chapter_0100.pdf.

Preliminary Search Report for French Patent Application No. 20092085 mailed on Jul. 30, 2021.

Agbariah Saeed M: "Common policy language for Policy Compliance and Change Detection System in managed service in data networks", The 2014 International Symposium on Networks, Computers and Communication, IEEE, Jun. 17, 2014 (Jun. 17, 2014), pp. 1-6, XP032626159.

Combined Search and Examination Report for Great Britain Patent Application No. GB2012533.2 mailed on Feb. 10, 2021.

Office Action for Mexican Patent Application No. MX/a/2020/008108 mailed on Nov. 16, 2023.

* cited by examiner

SYSTEM AND METHOD FOR AUTOMATIC FLEET PARTITIONING

RELATED APPLICATIONS

This application is a continuation of U.S. patent application Ser. No. 16/567,994, filed on Sep. 11, 2019, the content of which are incorporated by reference herein in its entirety.

BACKGROUND

Deployments of fleets of electronic devices such as printers, mobile computers or the like, may render the centralized management and/or securing of such devices time-consuming and prone to network congestion.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Various types of electronic devices, generally referred to herein as client devices, may be centrally managed, e.g. from a device management server to which the client devices are connectable via one or more communication networks. Central management of such devices can include deployment of new or updated software, updated operational parameters, collection of client device data for reporting or troubleshooting purposes, and the like.

Selecting the appropriate subset of client devices amongst a fleet of client devices under management of a given device management server may be enabled by assigning one or more tags to the client devices. A given client device management operation (e.g. deploying a software update) can then be initiated respective to all client devices assigned a certain tag. However, an operator of the device management server may be required to assign tags to client devices manually. Manual tag assignment can be time-consuming, and may require the operator to ascertain various attributes of the client devices (e.g. software versions, operational settings, deployment locations and the like) to ensure appropriate tag selection. Such attributes may be technically challenging to ascertain, rendering the manual tag selection process error-prone as well as time-consuming. Attributes of the client devices may also change over time, necessitating further manual tag assignment to avoid undesired application of management operations to client devices based on outdated tags.

Examples disclosed herein are directed to a system for automatic client device fleet partitioning, comprising: a plurality of client devices; a device management server connectable to the client devices and having a tag definition repository, a tag assignment repository and a processor configured to: receive a plurality of tag definitions, each including a tag assignment criterion, for storage in the tag definition repository; for each of the plurality of client devices, obtain respective client identifiers and respective client attribute sets for the client devices and, for each client device: (i) determine whether the client attribute set satisfies the tag assignment criterion of each tag definition; (ii) for each tag assignment criterion satisfied by the client attribute set, associate a corresponding tag name with the client identifier in the tag assignment repository; and (iii) for each tag assignment criterion not satisfied by the client attribute set, disassociate the corresponding tag name with the client device identifier in the tag assignment repository; receive a command to transmit control data to a subset of the client devices associated with a selected tag name; retrieve, from the tag assignment repository, the client identifiers associated with the selected tag name; and transmit the control data to the subset of the client devices based on the retrieved client identifiers.

Additional examples disclosed herein are directed to a method for automatic client device fleet partitioning, comprising: receiving a plurality of tag definitions, each including a tag assignment criterion, for storage in a tag definition repository of a device management server; for each of the plurality of client devices, obtaining respective client identifiers and respective client attribute sets for the client devices and, for each client device: (i) determining whether the client attribute set satisfies the tag assignment criterion of each tag definition; (ii) for each tag assignment criterion satisfied by the client attribute set, associating a corresponding tag name with the client identifier in a tag assignment repository of the device management server; and (iii) for each tag assignment criterion not satisfied by the client attribute set, disassociating the corresponding tag name with the client device identifier in the tag assignment repository; receiving a command to transmit control data to a subset of the client devices associated with a selected tag name; retrieving, from the tag assignment repository, the client identifiers associated with the selected tag name; and transmitting the control data to the subset of the client devices based on the retrieved client identifiers.

Further examples disclosed herein are directed to a device management server, comprising: a communications interface connectable to a plurality of client devices via a network; a memory storing a tag definition repository and a tag assignment repository; and a processor connected with the communications interface and the memory, the processor configured to: receive a plurality of tag definitions, each including a tag assignment criterion, for storage in the tag definition repository; for each of the plurality of client devices, obtain respective client identifiers and respective client attribute sets for the client devices and, for each client device: (i) determine whether the client attribute set satisfies the tag assignment criterion of each tag definition; (ii) for each tag assignment criterion satisfied by the client attribute set, associate a corresponding tag name with the client identifier in the tag assignment repository; and (iii) for each tag assignment criterion not satisfied by the client attribute set, disassociate the corresponding tag name with the client device identifier in the tag assignment repository; receive a command to transmit control data to a subset of the client devices associated with a selected tag name; retrieve, from the tag assignment repository, the client identifiers associated with the selected tag name; and transmit the control data to the subset of the client devices based on the retrieved client identifiers.

Figure 1:
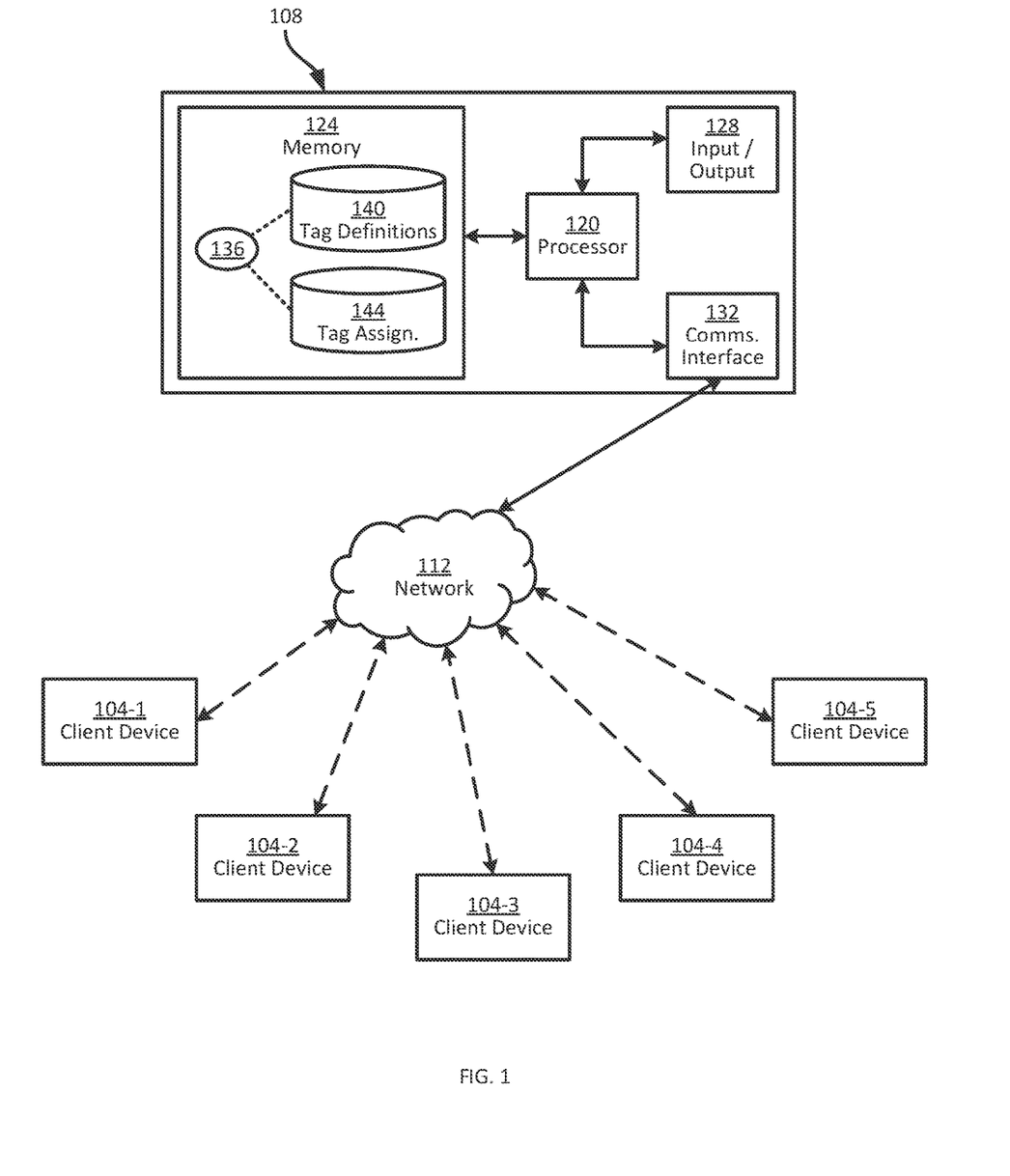
FIG. 1 is a diagram of a system for automatic fleet partitioning.

FIG. 1 depicts an example system 100 constructed in accordance with the teachings of this disclosure. The system 100 includes a plurality of client devices (also referred to herein simply as devices), of which five example devices 104-1, 104-2, 104-3, 104-4 and 104-5 (collectively referred to as the devices 104, and generically as a device 104; this nomenclature is also employed herein in connection with other elements) are illustrated. The devices 104 are deployed within any suitable environment or set of environments, including warehouses, production lines, retail environments, and the like, to perform any of a wide variety of tasks. For example, the client devices 104 can be encoding devices such as printers configured to generate labels for application to objects such as packages in the above-mentioned environments. The client devices 104 can also include other types of encoding devices, such as radio frequency identification (RFID) writers configured to encode data in RFID tags for application to the above-mentioned objects. In other examples, the client devices 104 can include mobile computing devices (e.g. handheld computers), data capture devices such as barcode scanners, or the like.

As will be discussed in greater detail below, each client device 104 has a set of attributes. The attribute sets of the client devices 104 can include operational parameters such as, in the case of a printer, a tone setting, a print speed setting, media size settings and the like. The attribute sets can also include one or more software versions (e.g. an operating system version, a print application version, and the like), a model number, a serial number or other hardware identifier (e.g. a media access controller (MAC) address), and the like. The attribute set of each client device 104 can also include attributes that are not directly tied to the hardware and software of the client device 104. For example, the attribute set can include a physical location of the client device, such as a facility identifier or an area identifier within a facility indicating where the client device 104 is currently deployed (e.g. at a shipping dock). The attribute set can further include a network location, for example as indicated by a portion of an Internet Protocol (IP) address assigned to the client device 104, by a network identifier (e.g. a service set identifier indicating which of a number of wireless local area networks the client device 104 is connected to), of the like.

The above-mentioned attribute sets define an operational context of each client device 104. As will be apparent to those skilled in the art, even identical client devices 104 may be deployed in different contexts within a facility, or across multiple facilities. The client devices 104 may therefore require different software, operational parameters or the like in order to accommodate the relevant operational context. For example, a client device 104 deployed at a shipping dock may require the installation of a shipping application thereon (e.g. to generate shipping labels for placement on packages), while a client device 104 deployed in a production area of the same facility may require the installation of a packaging application (e.g. to generate labels for placement on newly produced items) rather than the shipping application. In other words, the effective deployment of the fleet of client devices 104 across various different operational contexts may require the provision of different control data (e.g. software updates, operational parameters, and the like) to different subsets of the client devices 104.

To enable the automatic partitioning of the fleet of client devices 104 into the above-mentioned subsets, as well as the deployment of control data to relevant subsets of the client devices 104, the system 100 also includes a device management server 108, also referred to simply as the server 108. The server 108 is connectable to the devices 104 via a network 112, including any suitable combination of local and wide area networks.

The server 108 includes a central processing unit (CPU), also referred to as a processor 120 interconnected with a non-transitory computer readable storage medium, such as a memory 124. The memory 124 includes any suitable combination of volatile memory (e.g. Random Access Memory (RAM)) and non-volatile memory (e.g. read only memory (ROM), Electrically Erasable Programmable Read Only Memory (EEPROM), flash). The processor 120 and the memory 124 each comprise one or more integrated circuits (ICs).

The server 108 also includes at least one input device, and at least one output device, illustrated in FIG. 1 as an input/output device 128 interconnected with the processor 120. The input device includes any suitable one, or any suitable combination of, a keyboard, a mouse, and the like. The output device includes any suitable one, or any suitable combination of a display, a speaker, and the like. The input/output device 128 is configured to receive input and provide data representative of the received input to the processor 120, and to receive output from the processor 120 and present the output, e.g. via the emission of sound from a speaker, the rendering of visual indications on a display, and the like. In other examples, the input/output device 128 is physically distinct from the server 108. For example, the input/output device 128 may be connected to the processor 120 via the network 112 and another computing device (not shown).

The server 108 also includes a communications interface 132, enabling the server 108 to exchange data with other computing devices, such as the devices 104. The communications interface 132 includes any suitable hardware (e.g. transmitters, receivers, network interface controllers and the like) allowing the server 108 to communicate, e.g. with the devices 104, over the network 112.

The memory 124 of the server 108 stores one or more applications, each including a plurality of computer readable instructions executable by the processor 120. The execution of the above-mentioned instructions by the processor 120 causes the server 108 to implement certain functionality, as discussed herein. The applications are therefore said to be configured to perform that functionality in the discussion below. In the present example, the memory 124 of the server 108 stores a device management application 136, also referred to herein as the application 136. The memory 124 also stores a tag definition repository 140 containing data employed to partition the fleet of client devices 104 into the above-mentioned subsets via the assignment of tags to each client device 104. Further, the memory 124 stores a tag assignment repository 144 containing the current tag assignments generated via the use of the tag definitions in the repository 140.

The server 108 is configured, via execution of the application 136 by the processor 120, to obtain client attribute sets for each of the client devices 104, and to compare the client attribute set of each client device 104 with data from the tag definitions repository 140 to determine which tags to assign to the client device 104. The server 108 is further configured, responsive to commands to deploy control data to the client devices 104, to select appropriate subsets of the client devices 104 according to the tag assignments, and to transmit control data to the selected subsets of client devices 104. The above-mentioned tag assignment process is repeated responsive to various triggering events, such that the tags assigned to each client device 104 are updated responsive to changes in the attribute sets of the client devices 104. The functionality implemented by the server 108 will be described in greater detail below, following a discussion of certain components of the application 136, with reference to FIG. 2.

Figure 2:
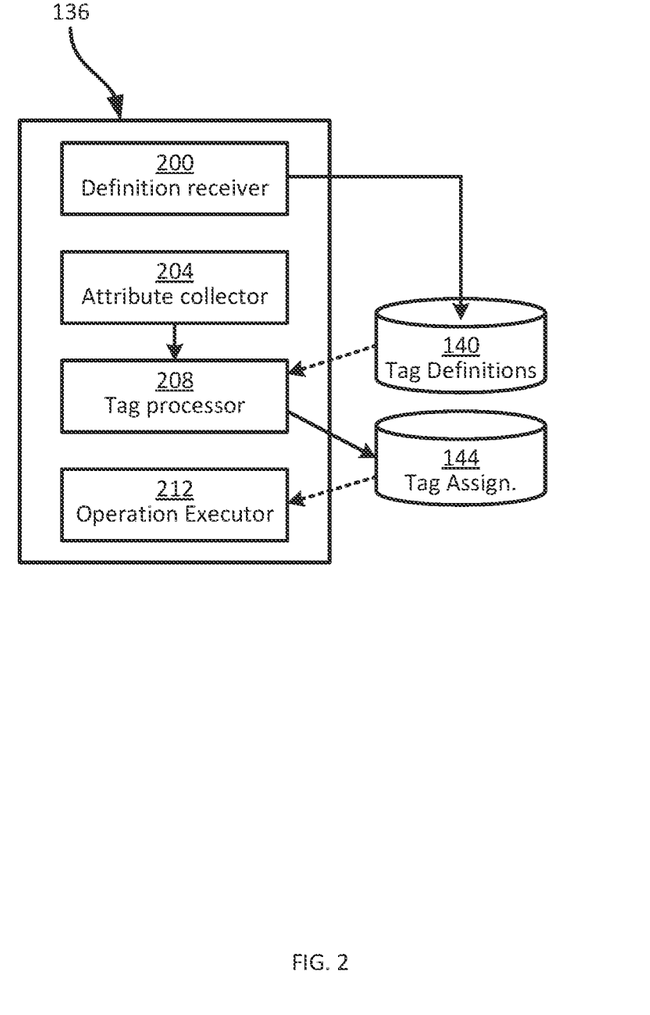
FIG. 2 is a block diagram of certain components of a device management application of the server of FIG. 1.

Referring to FIG. 2, certain components of the application 136 are illustrated. In some examples, the components of the application 136 are implemented as distinct, interacting applications rather than as parts of the application 136. Further, in some examples, some or all of the components of the application 136 are implemented as discrete hardware elements, such as application-specific integrated circuits (ASICs), field-programmable gate arrays (FPGAs) and the like.

The example application 136 shown in FIG. 2 includes a definition receiver 200 configured to receive tag definitions for storage in the repository 140. The tag definitions define, for each of a plurality of tags, criteria which, if satisfied by the attribute set of a given client device 104, result in assignment of the tag to that client device 104. The application 136 also includes an attribute collector 204 configured to obtain client attribute sets from the client devices 104, for use in assigning tags to the client devices 104. The application 136 further includes a tag processor 208 configured to compare the client attribute sets obtained by the collector 204 with the tag definitions in the repository 140, to select tags to associate or disassociate with the client devices 104. The tags selected for association with client devices 104 are written by the tag processor 208 to the repository 144, while previously assigned tags selected for disassociation with client devices 104 are removed from the repository 144.

The application 136 also includes an operation executor 212 configured to receive commands (e.g. from an operator of the system 100, via the input/output device 128) to transmit control data to certain subsets of the client devices 104. The commands include one or more tags indicating which subset of the fleet of client devices 104 the control data is to be sent to. The operation executor is configured to retrieve the identifiers of the relevant client devices 104 from the repository 144, and to transmit the above-mentioned control data to those client devices 104.

Figure 3:
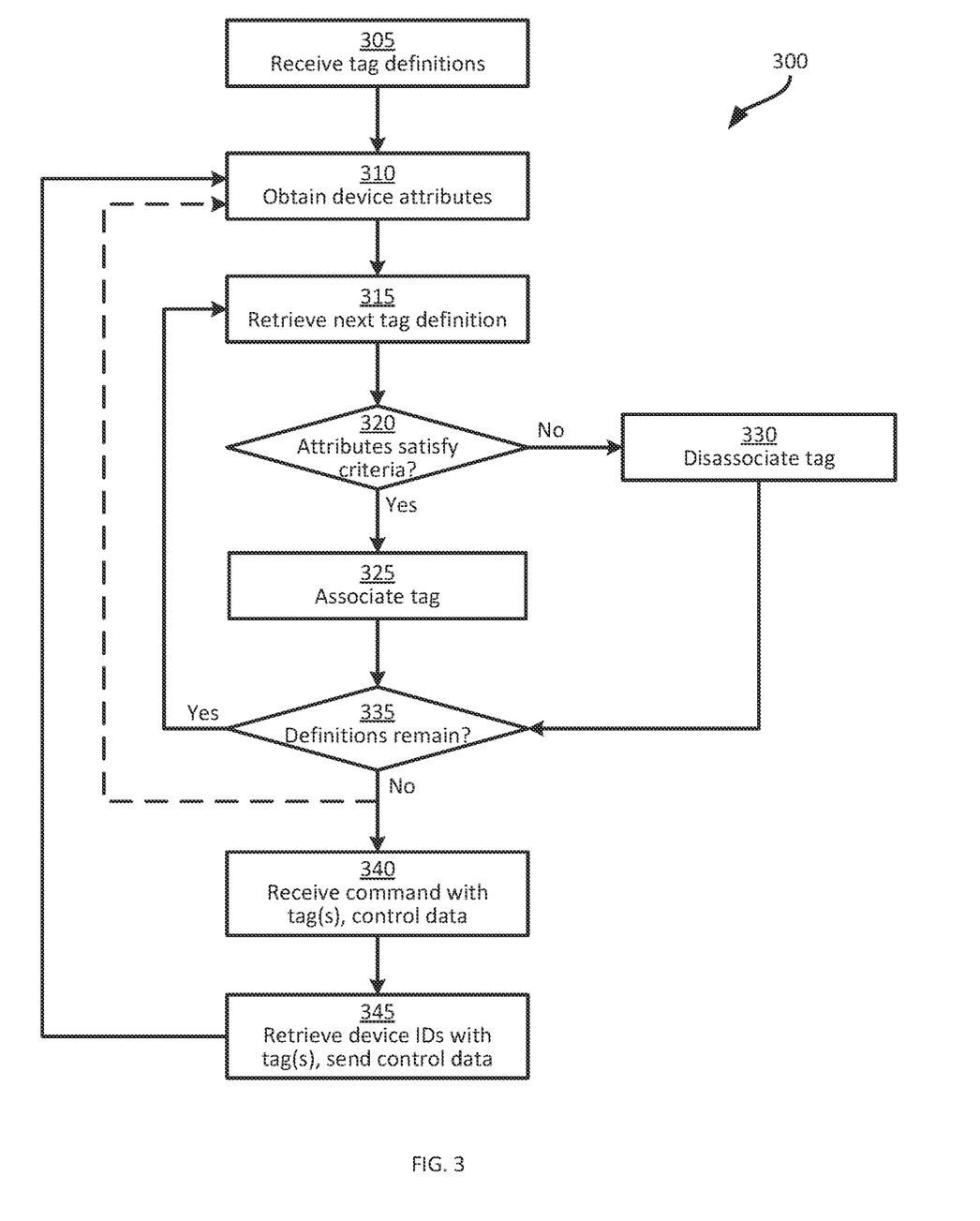
FIG. 3 is a flowchart of a method for automatic fleet partitioning.

Turning now to FIG. 3, an example method 300 of automatically partitioning a fleet of client devices is illustrated in accordance with the teachings of this disclosure. The blocks of the method 300 are performed by the server 108, as configured via execution of the application 136 by the processor 120.

At block 305, the server 108 is configured to receive tag definitions for storage in the tag definition repository 140 in the memory 124. Each tag definition includes at least one tag assignment criterion, which is later compared to the client attribute set of each client device 104 to determine whether a corresponding tag name should be assigned to that client device 104. The tag name is specified in the tag definition, either as a fixed string or as a dynamic name, which may be generated based on other data, including the client attributes themselves. Table 1, below, contains an example set of tag definitions received at block 305 and stored in the repository 140.

TABLE 1

Example Tag Repository 140

| Definition ID | Tag Name | Tag Criteria |
| --- | --- | --- |
| 1 | Production | a) Location = Areas A or B<br>b) Device Model = ZX32 |
| 2 | Shipping | Location = Area C |
| 3 | Facility: <Third octet of IP address> | Includes "Production" tag |

As seen in Table 1, the tag repository 140 contains three tag definitions. The first definition specifies a tag name "Production", which is to be assigned to client devices 104 located in specified areas of a facility and having a given model number. The second definition specifies a tag name "Shipping", which is to be assigned to client devices 104 located in another specified area. The third definition does not specify a static tag name, but rather includes a dynamic name generation. In particular, any client device 104 that has been assigned the "Production" tag (that is, tag assignments themselves are also client attributes upon which further tag assignments can depend) is to be assigned a tag whose name is the string "Facility", appended by the third octet of that client device's IP address. The third definition may be employed, for example, to partition the client devices 104 between subnets in a facility to reduce network congestion during a software update. Various other tag definitions may also apply tags to client devices 104 based on their roles or uses (e.g. a subset of client devices 104 may be assigned a tag indicating that they are deployed in an inventory picking role).

The tag definitions received at block 305 can be received via various mechanisms. For example, the server 108 can present a tag definition input interface via the input/output device 128, and receive selections via the input/output device representing the tag names and criteria for each tag definition. For example, the above-mentioned interface can include fields for entering tag names, or expressions to define dynamically-generated tag names. The interface can also include fields for entering tag criteria, for example as logical expressions (e.g. Boolean logic statements, regular expressions (regexes)), as selections from dropdown menus of available device attributes and expected values, or the like.

In other examples, in addition to or instead of the above-mentioned tag definition creation interface, the server 108 can receive the tag definitions by importing a file containing tag definitions according to a predetermined syntax. For example, the server 108 can be configured to receive an eXtensible Markup Language (XML) or JavaScript Object Notation (JSON) file, or a file in any other suitable format that contains tag definitions in the predetermined syntax. The file may be imported from a portable storage device (e.g. a USB key) connected to the server 108, transmitted to the server 108 via the network 112, or the like.

Although the performance of block 305 is illustrated once in the method 300, the contents of the tag definition repository 140 may be updated to alter, add or remove tag definitions at any time. That is, changes to the repository 140 may be received at the server 108 in parallel with the performance of any other portion of the method 300.

From block 310 to block 335, the server 108 is configured to perform a tag assignment process respective to a given client device 104. The tag assignment process begins at block 310 with the receipt, at the server 108, of a client attribute set for one of the client devices 104. The tag assignment process (i.e. blocks 310 to 335) is performed at least once for each client device 104, and may be performed repeatedly for client devices 104 as the client attributes of those client devices 104 change over time. The server 108 can therefore perform multiple instances of blocks 310 to 335 simultaneously, dependent on the timing of receipt of client attribute sets.

At block 310, is configured to obtain a client attribute set for a given client device 104. To obtain the client attribute set, the server 108 can be configured to transmit a request to the client device 104 at a configurable frequency (e.g. once per hour, although both greater and lower frequencies are also contemplated). The request can identify specific attributes, or can omit such attribute identifiers, with the client device 104 being configured to transmit a predetermined attribute set in response to the request.

In other examples, the server 108 obtains the client attribute set at block 310 without transmitting a request. For example, the client devices 104 can be configured to automatically transmit a predetermined client attribute set to the server 108 in response to certain events. Examples of such events include upon establishment of a connection with the network 112 (or re-establishment when the client device 104 roams), upon powering up or rebooting, or the like. For example, each client device 104 can store an address of the server 108, for use at device startup to establish communications with the server 108. Upon establishing communications with the server 108, the device 104 can be configured to transmit the client attribute set to the server 108. The client devices 104 can also be configured to transmit the client attribute set to the server 108 at a configurable frequency (e.g. every six hours, although both greater and lower frequencies are also contemplated).

The performance of block 310 can also include retrieving client attributes from a source other than the client devices 104 themselves. For example, as shown in Table 1, the tags assigned to a client device 104 are also employed as client attributes for the purpose of further tag assignments. Therefore, at block 310 the server 108 can also retrieve the current tags assigned to the client device 104.

Figure 4:
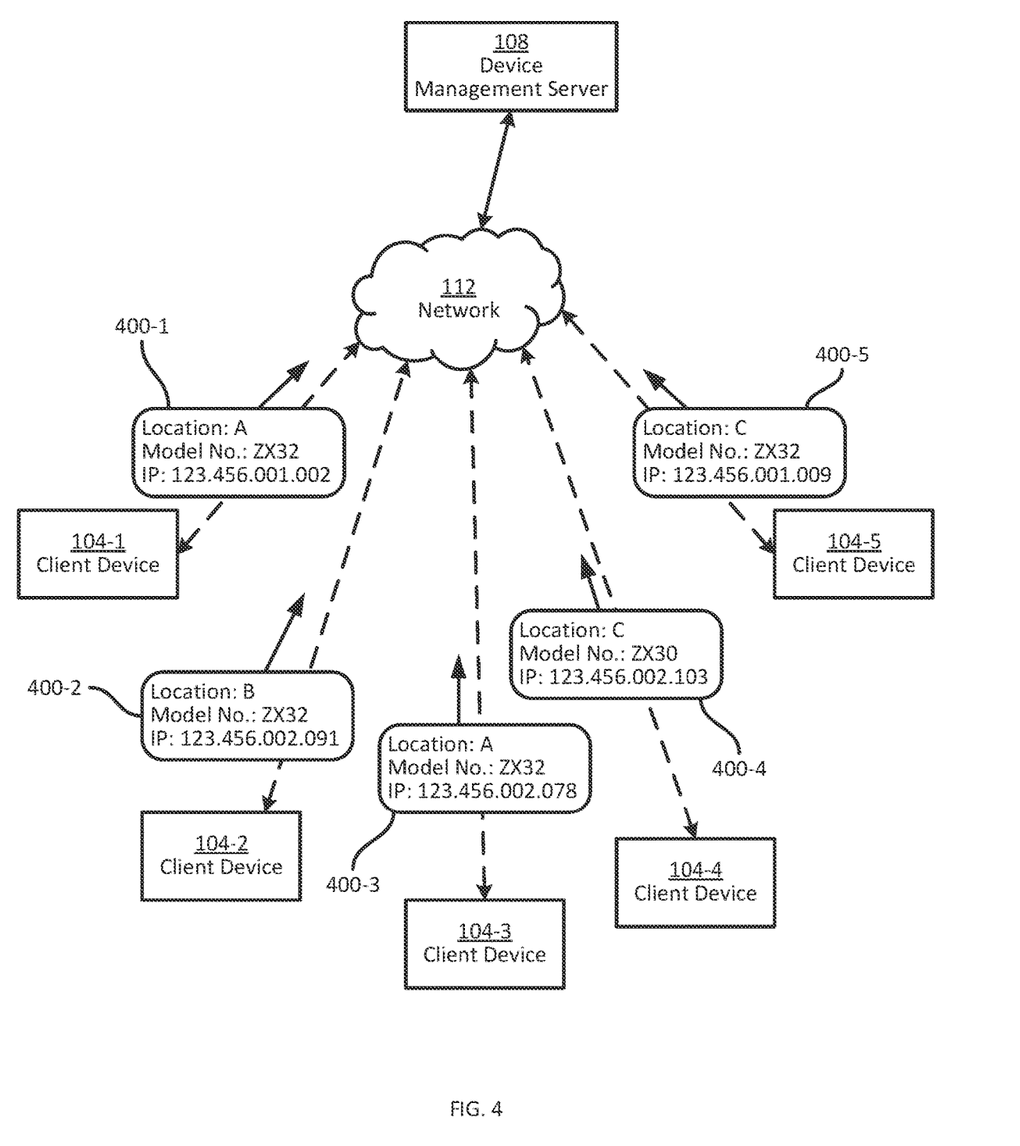
FIG. 4 is a diagram of the system of FIG. 1 during the performance of the method of FIG. 3.

Turning briefly to FIG. 4, client attribute sets 400-1, 400-2, 400-3, 400-4 and 400-5 are shown being transmitted by the client devices 104 (either proactively or in response to requests from the server 108) to the server 108 via the network. The performance of blocks 310 to 335 will first be discussed in connection with the client attribute set 400-1, and the tag assignment repository will be assumed to be empty prior to this example performance of blocks 310 to 335. As seen in FIG. 4, each client attribute set 400 includes a location identifier, a model number and an IP address. The location identifier, in the present example, is one of a plurality of predefined areas or zones within a facility. The location can be preconfigured on each client device 104 (e.g. upon deployment of the client device 104 at the start of a shift). In other examples, the location can correspond to an access point of a local area network within the facility, global positioning system (GPS) coordinates, or the like.

The client attribute sets need not contain identical attributes as shown in FIG. 4. For example, different types of client devices 104 can be configured to provide different sets of attributes. Further, the client attribute sets can include a wide variety of other attributes, instead of or in addition to those illustrated in FIG. 4. Other examples of client attributes include software versions for one or more installed applications, operational parameters such as print quality settings, environmental conditions such as temperature and humidity, remaining battery capacity, and the like. In some examples, the client devices 104 can provide attributes such as a count of labels printed; the server 108 can be configured to apply a maintenance tag to any client devices 104 that exceed a configurable label count threshold. In further examples, the threshold may be a threshold rate of printing rather than a static count threshold.

Returning to FIG. 3, at block 315, having obtained the client attribute set 400-1, the server 108 is configured to retrieve a tag definition from the repository 140. In the present example, the server 108 is configured to retrieve the first definition shown in Table 1 presented earlier. At block 320, the server 108 determines whether the client attribute set 400-1 satisfies the tag criteria of the retrieved tag definition. Therefore, in the present example, the server 108 determines whether the attribute set 400-1 satisfies the criterion shown in the first row of Table 1. Specifically, the server 108 determines whether the location identifier in the client attribute set 400-1 is either "A" or "B", and whether the model number matches the string "ZX32". As will be apparent from FIG. 4, the determination at block 320 is affirmative in this example. Therefore, the server 108 proceeds to block 325, at which the server 108 associates the tag "Production" with the client device 104-1.

The server 108 associates a tag with a client device 104 by inserting a record in the tag assignment repository 144 containing a client device identifier (e.g. a serial number, network address or the like) and the tag name of the relevant tag. In the present example, therefore, the tag assignment repository 144 is updated as shown below in Table 2.

TABLE 2

Example Tag Assignment Repository 144

| Device ID | Tags |
| --- | --- |
| 104-1 | Production |
| 104-2 | |
| 104-3 | |
| 104-4 | |
| 104-5 | |

When the repository 144 already includes the tag to be associated at block 325, no action is required by the server 108 at block 325. When the determination at block 320 is negative, the server 108 is instead configured to disassociate the relevant tag with the client device 104 at block 330. Disassociating a tag includes removing the corresponding tag name from the record corresponding to the client device 104 in the repository 144. If the relevant tag name is not present in the repository 144, then no action is taken by the server 108 at block 330.

Following the performance of block 325 or block 335, the server 108 proceeds to block 335, at which the server 108 is configured to determine whether further tag definitions remain to be assessed for the current client device 104. In the present example, two tag definitions have not yet been assessed against the client attribute set 400-1 and the determination at block 335 is therefore affirmative. The server 108 therefore returns to block 315 and selects the next tag definition. Having selected the next tag definition (e.g. the second row of Table 1 in the present example), the server 108 is configured to repeat the performance of block 320, and one of blocks 325 and 330 based on the determination made at block 320. The above process is then repeated for the third row of Table 1.

As will be apparent from FIG. 4 and Table 1, the client attribute set 400-1 does not satisfy the tag assignment criteria in the second row of Table 1. However, the client attribute set 400-1, in combination with the "Production" tag previously assigned to the client device 104-1, does satisfy the tag assignment criteria defined in the third row of Table 1. Therefore, at a further performance of block 325, the repository 144 is updated as shown below in Table 3.

TABLE 3

Updated Example Tag Assignment Repository 144

| Device ID | Tags |
| --- | --- |
| 104-1 | Production; 001 |
| 104-2 | |
| 104-3 | |
| 104-4 | |
| 104-5 | |

As seen in Table 3, a tag name corresponding to the third tag assignment criterion of Table 1 has been associated with the client device 104-1. The tag name, as indicated in Table 1, is dynamically generated by the server 108 from the third octet of the IP address of the client device 104-1. The tag name may, for example, indicate a subnet of the network 112 to which the client device 104-1 is currently connected.

Following the above performance of block 325, the determination at block 335 is negative, as all three rows of the repository 140 have been processed respective to the client attribute set 400-1. As noted earlier and indicated by the dashed line extending from the "No" determination from block 335 back to block 310, the server 108 is configured to repeat the performance of blocks 310 to 335 for each other client attribute set 400 shown in FIG. 4. Table 4 illustrates a further updated tag assignment repository 144 following completion of the performance of blocks 310 to 335 for each client attribute set 400.

TABLE 4

Updated Example Tag Assignment Repository 144

| Device ID | Tags |
| --- | --- |
| 104-1 | Production; 001 |
| 104-2 | Production; 002 |
| 104-3 | Production; 001 |
| 104-4 | Shipping |
| 104-5 | Shipping |

Following completion of the tag assignment process for each client device 104, the server 108 may proceed to block 340. At block 340, the server 108 is configured to receive a command to transmit control data to a subset of the client devices 104. The command identifies the subset with one or more selected tag names. For example, the server 108 may receive a command to transmit an updated software package to the subset of client devices 104 having the tags "Production" and "001" assigned thereto. A wide variety of other types of control data are also contemplated, including changes to operational parameters (e.g. tone settings, print speed settings for printers), instructions to launch or terminate certain applications at the relevant client devices 104, instructions to reboot, and the like. The command can be received, for example, via an operator interface provided via the input/output device 128, listing tags available for selection, as well as control data available for selection and transmission to the client devices 104.

Responsive to receiving the command at block 340, at block 345 the server 108 is configured to retrieve, from the tag assignment repository 144, identifiers of any client devices 104 that are associated with the tag names from the command. Thus, in the present example, with reference to Table 4, the server 108 retrieves the device identifiers "104-1" and "104-3" at block 345. The server 108 is further configured, having retrieved the client device identifiers, to transmit the control data received at block 340 to the corresponding client devices 104. Therefore, in the present example, the server 108 is configured to transmit the above-mentioned software package to the client devices 104-1 and 104-3 via the network 112. As noted previously, a wide variety of other control data may also be deployed at block 345. In some examples, control data can be sent automatically at block 345, rather than received in an operator command at block 340. For example, the server 108 can be configured to apply various security settings automatically based on tags applied to the client devices 104, e.g. according to the current locations of the client devices 104.

Following execution of the management operation defined by the command, the server 108 may return to block 310. In other words, the server 108 continues monitoring for updated client attribute sets from the client devices 104. The tag assignment process of blocks 310 to 335, initiated in response to obtaining updated client attribute sets, and the management operation process of blocks 340 and 345, need not be performed sequentially as illustrated in FIG. 3. In some examples, commands to transmit control data to a subset of the client devices can be received in parallel with the tag assignment process (or, as noted earlier, with multiple simultaneous tag assignment processes).

In the examples above, the tag assignment repository 144 was initially empty and the performance of block 330 therefore involved simply taking no action. In other examples, the performance of block 330 involves altering the tag assignment repository 144 to remove a previously assigned tag name. For example, referring to FIG. 5, the client devices 104-1 and 104-4 are illustrated transmitting update client attribute sets 500-1 and 500-4. In particular, the client attribute set 500-1 indicates that the client device 104-1 has an updated IP address in a different subnet than previously shown in FIG. 4. Further, the client attribute set 500-4 indicates that the client device 104-4 has left the area "C" and is now located in an area "D". Two further performances of the tag assignment process of blocks 310 to 335 are therefore performed.

Figure 5:
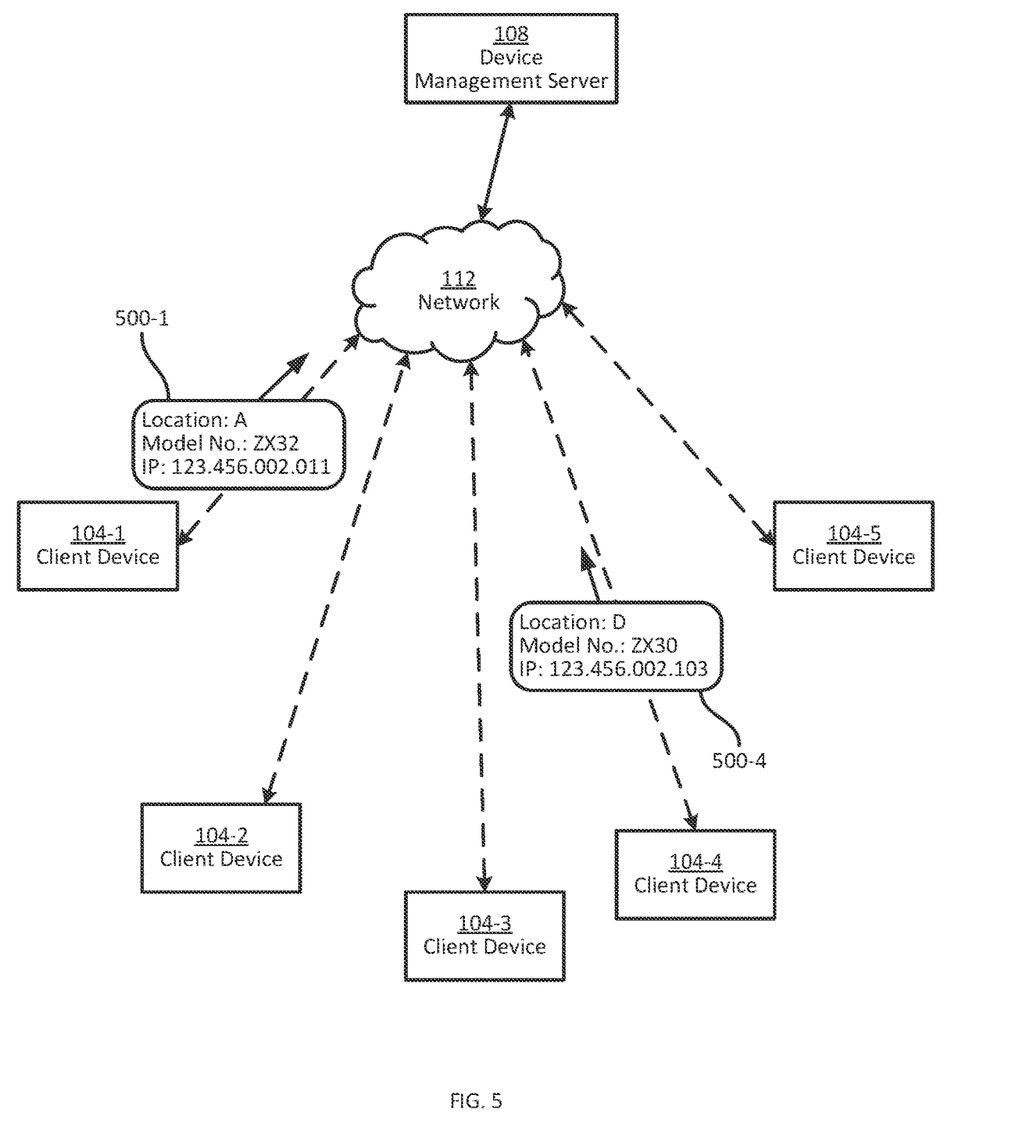
FIG. 5 is a further diagram of the system of FIG. 1 during the performance of the method of FIG. 3.

For the client attribute set 500-1, the determination at block 320 for the first tag definition remains affirmative, and the server 108 takes no action with respect to the contents of the tag assignment repository. The determination at block 320 for the second tag definition remains negative, and the server 108 therefore also takes no action. The determination at block 320 for the third tag definition is affirmative, but the third tag definition defines a dynamic tag name based on the IP address of the client devices 104. Because the IP address of the client device 104-1 has changed, at block 325 the tag repository 144 is updated to replace the tag name "001" previously shown in Table 4 with the tag name "002".

Turning to the client device 104-4, the determination at block 320 for the first tag definition is negative, and no action is taken by the server 108. The determination at block 320 for the second tag definition is also negative, however the "Shipping" tag is currently associated with the client device 104-4. Therefore, at block 330 the server 108 is configured to disassociate the "Shipping" tag with the client device 104-4 by deleting that tag name from the relevant record of the tag assignment repository 144, as shown below in Table 5.

TABLE 5

Updated Example Tag Assignment Repository 144

| Device ID | Tags |
|---|---|
| 104-1 | Production; 001 |
| 104-2 | Production; 002 |
| 104-3 | Production; 001 |
| 104-4 | |
| 104-5 | Shipping |

In further examples, alteration of the tag definitions themselves can lead to updated tag assignments. That is, responsive to a performance of block 305, the server 108 can be configured to automatically repeat the performance of blocks 310 to 335 for each client device 104, using the most recently received client attribute set for each client device 104.

In still further examples, if the performances of blocks 310 to 335 for a given client device (i.e. for a given client attribute set) has resulted in any changes to the contents of the tag assignment repository 144, the server 108 can be configured to automatically repeat the tag assignment process. That is, the server 108 can be configured, upon assessment of the final tag definition, to make an affirmative determination at block 335 and repeat processing of all tag definitions. As noted above, the tag definitions can include criteria relying on the presence or absence of other tag names, and the association or disassociation of one tag at blocks 325 or 330 may necessitate association or disassociation of the client device 104 with another, previously processed tag. Alternatively, the server 108 can simply detect and apply such changes following receipt of the next client attribute set from the client device 104.

The device management activities performed by the server 108 can extend to a variety of activities other than those mentioned above. For example, in some embodiments the client devices 104 can be printers forming a print farm, and the server 108 can be deployed to manage a print queue for the print farm. That is, the server 108 can receive print requests, and select one or more of the client devices 104 to execute the corresponding print job. In such embodiments, the server 108 can apply tags to subsets of the client devices 104 to subdivide the print farm for the execution of separate print jobs. The server 108 can also employ tags to provide redundancy amongst the client devices 104, such that if a client device 104 selected according to a first tag for a print job (or other task) is offline, a client device 104 having a second tag can be selected to perform the print job instead.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as separately claimed subject matter.

The invention claimed is:

1. A system, comprising:
  a plurality of client devices;
  a server in communication with the plurality of client devices, the server includes:
    memory storing instructions; and
    a processor configured to execute the instructions to:
      associate client identifiers of a plurality of client devices with one or more tag names based on client attribute sets of the plurality of client devices and a tag assignment criterion, the client attributes for each of the plurality of client devices including a type of the client device and a location of the client device;
      identify a first subset of the plurality of client devices that have first specified client attributes associated with a first one of the tag names and a second subset of the plurality of client devices that have second client attributes associated with a second one of the tag names; and
      transmit first control data to the first subset of the plurality of client devices based on the first one of the tag names and second control data to the second subset of the plurality of client devices based on the second one of the tag names, the first control data includes first actions to be completed by the client devices of the first subset of the plurality of the client devices and the second control data includes second actions to be completed by the client devices of the second subset of the plurality of the client devices,
  each of the client devices associated with the first subset of the plurality of client devices executing the first control data to program each of the client devices associated with the first subset to perform a first task,
  each of the client devices associated with the second subset of the plurality of client devices executing the second control data to configure each of the client devices associated with the second subset to perform a second task,
  wherein in response to the server determining that a location of at least one of the client devices in the first subset has changed, the processor of the server disassociates the at least one of the clients from the first subset, associates the at least one of the client devices with the second subset or a third subset of the plurality of client devices, and transmits the second control data or third control data to the at least one of the devices, and
  wherein in response to receiving the second control data or the third control data, the at least one of the client devices executes the second control data to re-program the at least one of the client devices to perform the second task or a third task that is different from the first task.

2. The server of claim 1, wherein the first control data includes first software to be installed for the client devices of the first subset of the plurality of client devices and the second control data includes second software to be installed for the client devices of the second subset of the plurality of client devices.

3. The server of claim 1, wherein the first control data includes first operational settings for the first subset of the plurality of client devices and the second control data includes second operational settings for the second subset of the plurality of client devices.

4. The server of claim 1, wherein the server is configured to generate the tag names, based on the client attribute set, according to a dynamic tag name definition in a tag definition.

5. The server of claim 1, wherein the processor is further configured to:
  receive updated tag assignment criterion; and
  re-associate at least one of the client identifiers of the plurality of client devices with a different one of the tag names based on changes to the tag assignment criterion.

6. The server of claim 1, wherein the tag assignment criterion includes a statement defining a search pattern.

7. The server of claim 6, wherein the at least one of the client identifiers corresponds to one of the client devices in the first subset of the plurality of client devices, and after re-association, the one of the client devices is identified as being in the second subset or a third subset of the plurality of client devices.

8. The server of claim 1, wherein the processor is configured to receive tag definitions including the tag assignment criterion via at least one of a tag definition creation interface or a file containing the tag definitions according to a predetermined syntax.

9. A method of automatic client device fleet partitioning, comprising:
  associating client identifiers of a plurality of client devices with one or more tag names based on client attribute sets of the plurality of clients and a tag assignment criterion;
  identifying a first subset of the plurality of client devices that have first specified client attributes associated with a first one of the tag names and a second subset of the plurality of client devices that have the client identifiers associated with a second one of the tag names; and
  transmitting first control data to the first subset of the plurality of client devices based on the first one of the tag names and second control data to the second subset of the plurality of client devices based on the second one of the tag names, the first control data includes first actions to be completed by the client devices of the first subset of the plurality of the client devices and the second control data includes second actions to be completed by the client devices of the second subset of the plurality of the client devices;

executing, by each of the client devices associated with the first subset of the plurality of client devices, the first control data to program each of the client devices associated with the first subset to perform a first task;

executing, by each of the client devices associated with the second subset of the plurality of client devices, the second control data to configure each of the client devices associated with the second subset to perform a second task;

determining that a location of at least one of the client devices in the first subset has changed;

disassociating the at least one of the clients from the first subset in response to the server determining that a location of at least one of the client devices in the first subset has changed;

associating the at least one of the client devices with the second subset or a third subset of the plurality of client devices;

transmitting the second control data or third control data to the at least one of the devices; and in response to receiving the second control data or the third control data, executing the at least one of the client devices executes the second control data to re-program the at least one of the client devices to perform the second task or a third task that is different from the first task.

10. The method of claim 9, wherein the first control data includes first software to be installed for the client devices of the first subset of the plurality of client devices and the second control data includes second software to be installed for the client devices of the second subset of the plurality of client devices.

11. The method of claim 9, wherein the first control data includes first operational settings for the first subset of the plurality of client devices and the second control data includes second operational settings for the second subset of the plurality of client devices.

12. The method of claim 9, further comprising generating the tag names, based on the client attribute set, according to a dynamic tag name definition in a tag definition.

13. The method of claim 9, further comprising:
receiving updated tag assignment criterion; and
re-associating at least one of the client identifiers of the plurality of client devices with a different one of the tag names based on changes to the tag assignment criterion.

14. The method of claim 13, wherein the at least one of the client identifiers corresponds to one of the client devices in the first subset of the plurality of client devices, and after re-association, the one of the client devices is identified as being in the second subset or a third subset of the plurality of client devices.

15. The method of claim 9, wherein the tag assignment criterion includes a statement defining a search pattern.

16. The method of claim 9, further comprising receiving tag definitions including the tag assignment criterion via at least one of a tag definition creation interface or a file containing the tag definitions according to a predetermined syntax.

* * * * *